United States Patent [19]

Chanteau

[11] Patent Number: 5,382,971
[45] Date of Patent: Jan. 17, 1995

[54] TELEVISION SIGNAL CABLE DISTRIBUTION SYSTEM AND ASSEMBLY OF ELEMENTS FOR CONSTITUTING SUCH A SYSTEM

[75] Inventor: Pierre Chanteau, La Haye, Malherbe, France

[73] Assignee: U.S. Philips Corporation, New York, N.Y.

[21] Appl. No.: 107,499

[22] Filed: Aug. 17, 1993

[30] Foreign Application Priority Data

Aug. 19, 1992 [FR] France .................................. 92 10126

[51] Int. Cl.$^6$ ............................................. H04N 7/10
[52] U.S. Cl. ......................................... 348/6; 348/12; 455/3.2
[58] Field of Search .................... 358/86; 455/3.1, 3.2, 455/6.1, 6.2, 132, 188.1; H04N 7/10; 348/6, 8, 10, 12, 13

[56] References Cited

U.S. PATENT DOCUMENTS 4,864,632  9/1989  Muriyama ............................ 455/3.1
5,058,198 10/1991  Rocci .................................... 358/86
5,073,930 12/1991  Green ................................... 358/86

*Primary Examiner*—James J. Groody
*Assistant Examiner*—Sherrie Hsia
*Attorney, Agent, or Firm*—Robert J. Kraus

[57] ABSTRACT

The distribution network (67, 68) comprises as many cables as there are satellite signal sources and terrestrial television signals are added on each of these cables to satellite television signals by utilizing a multiple coupler (66). For each group of users there is a shunting unit (70, 71, 72, 73) which is traversed by the cables of the distribution network and which couples each cable to one of the multiple inputs of a switching unit (85 to 92) having multiple outputs in their proximity. For each output this switching unit selects an input as a function of the value of a control signal applied to the output.

9 Claims, 3 Drawing Sheets

TELEVISION SIGNAL CABLE DISTRIBUTION SYSTEM AND ASSEMBLY OF ELEMENTS FOR CONSTITUTING SUCH A SYSTEM

BACKGROUND OF THE INVENTION

The invention relates to a system for distributing television signals to a plurality of user installations, which system comprises
- an assembly of several different satellite television signal sources,
- a terrestrial television signal source,
- at least a cable distribution network serving the users on the basis of the assembly of signal sources,
- at least a branching element allocated to a group of user installations and having a plurality of outputs each coupled to one of the installations of the group, a plurality of inputs each coupled to one of the cables of the distribution network, and switching means whose number is equal to the number of its outputs, each switching means being assigned to one of the outputs for selecting one of the inputs of the branching element and connecting it to the relevant output, this selection being made for each of said means as a function of a control signal received by the corresponding user installation.

Such a system serving a group of users from communal aerials is used, for example in a building comprising a plurality of apartments. Such a system is known as "MATV" to those skilled in the art.

The conventional MATV systems authorize the user to make a selection from several broadcasts by tuning to one or the other carrier frequency. On the basis of frequencies ranging between 950 and 1750 MHz, for example in the case of signals received from a satellite by means of a converter (low noise converter, or outdoor unit) which supplies a signal at a frequency in this range of frequencies, with channels having a width of approximately 30 MHz, it is possible to distinguish 24 different channels. Nevertheless, this number is insufficient, considering that, for example a satellite assembly such as "Astra" has already more than 24 channels.

German utility model DE-U-9 108 899 (Mikroelektronik Neuhaus GmbH) describes a system using two signal sources H and V corresponding to two polarizations from one and the same satellite and, for serving a plurality of users, it comprises, step by step in a two-cable distribution network, branching elements having two inputs (one for each polarization), each element selecting one of the two inputs as a function of the value of a control voltage received by the receiver. This document describes only the case of the two polarizations and does not suggest any means which may be used in the case where, for example it is desirable to receive a plurality of satellites.

SUMMARY OF THE INVENTION

It is an object of the invention to provide a system whose architecture is such that it allows service to a large number of users, based on a large number of signal sources with a reduced installation effort and economic use of material, all this with a minimum change of the customary professional installation techniques. It is also desirable that the capacities of the installation can be improved without too many modifications when the number of users or sources is increased. Each user should also be able to select a source, independently of other users.

In a system according to the invention, comprising more than two separate satellite television signal sources, the distribution network comprises a number of distribution cables which is equal to the number of separate satellite television signal sources and is provided with a multiple coupler for repeating the terrestrial television signals on each cable by adding them to the satellite television signals, and the branching element is constituted by a shunting unit and at least one switching unit, the shunting unit being provided with means for connecting a plurality of cables of the distribution network and having at least a group of a plurality of outputs and means for permanently taking off a part of the power of the signal on each cable and for applying it to a corresponding output of the group of outputs, a switching unit having as many inputs as the shunting unit allows connection of cables, each of these inputs being connected to an output of the group of outputs of the shunting unit, at least one output connected by means of a cable to one of said user installations and comprising said switching means for selecting one of its inputs and connecting it to its output.

In such a system it is the type of shunting unit that varies (the number of outputs varies) with the number of user installations and, in contrast, there is a single switching unit model (preferably comprising several elementary switches) in which only the number of these switches may vary. The switch is the most delicate element to be realised: the system according to the invention is thus advantageous in that it allows manufacture of the switch in large quantities at low cost.

In an advantageous embodiment a shunting unit has two groups of outputs and/or the connection means of a shunting unit are provided for connecting four cables.

A switching unit advantageously has four outputs (and consequently four switches).

The shunting units, which have a parallelepiped shape and are provided for a number of cables which is equal to N, advantageously comprise N output connectors on each of the two opposite sides and no connector on two opposite sides located between the opposite sides comprising the output connectors.

It is thus possible to couple two shunting units side by side without covering a connector, and two coupled shunting units may have all their outputs on the same side.

An assembly of elements for constituting a system according to the invention advantageously comprises two types of switching units having a parallelepiped shape, a first type comprising N input connectors situated on the same side and corresponding to the output connectors of a shunting unit, and a second type comprising twice N input connectors situated on the same side and corresponding to the output connectors of the two shunting units arranged side by side.

It is thus possible to easily connect a single switching unit of the second type to an assembly of two shunting units.

For selecting one of two sources, it will be evident that two control voltages should be used. Nevertheless, there is a problem when one desires to select more than two sources by means of existing material supplying only two control voltages.

To solve this problem in a system comprising at least one installation for a user in possession of a satellite decoder (or indoor unit) having a television signal input for satellite signals, which decoder is capable of applying a DC control voltage to this input for the purpose of controlling the selection, by means of an external apparatus, of one of two signals, and which has a control current output for controlling a magnetic polarizer in a parabola, a connection and control unit is advantageously inserted in the cable between the output of the switching unit and the television signal input of the satellite decoder, and is also connected to said control current output of the satellite decoder, this connection unit comprising connection means between the part of the cable coupled to the output of the switching unit and the part coupled to the television signal input of the satellite decoder, causing them to communicate in the television frequency band and to DC-separate them as well as for low frequencies, and an adjustable control signal generator which applies an ad hoc control signal to the part of the cable coupled to the output of the switching unit, which control signal is determined as a function of the value of said direct voltage applied by the satellite decoder to its television signal input and of the value of said control current of the satellite decoder.

BRIEF DESCRIPTION OF THE INVENTION

These and other aspects of the invention will be apparent from and elucidated with reference to the embodiments described hereinafter.

In the drawings

DETAILED DESCRIPTION OF PREFERRED EMBODIMENTS OF THE INVENTION

Figure 1:
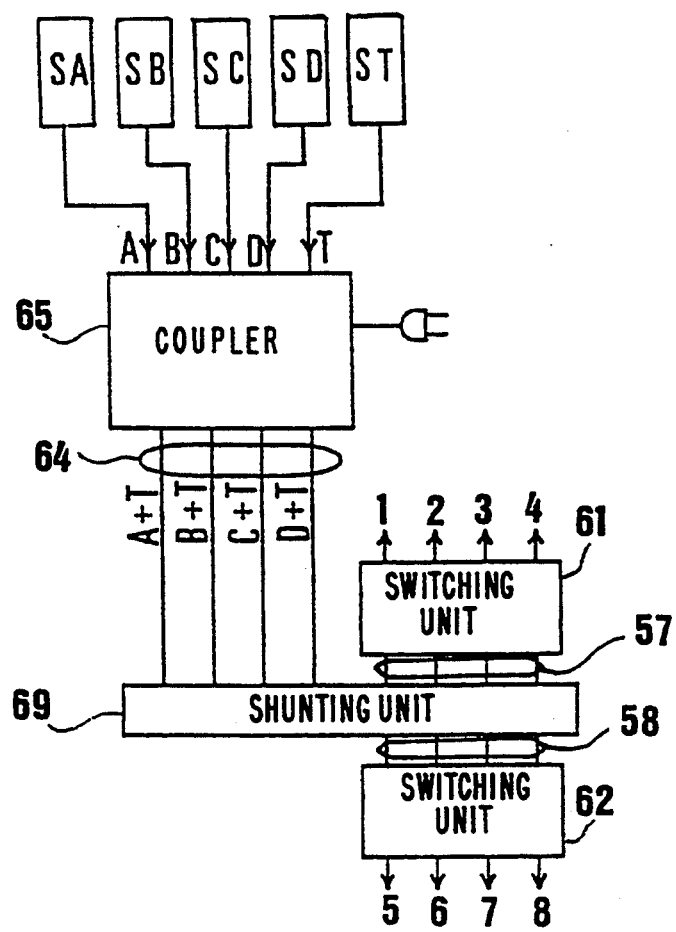
FIG. 1 is a diagram of a small system according to the invention, serving 8 users, in which system the user installations are not shown.

The television signal cable distribution system, whose diagram is shown in FIG. 1, serves eight user installations. It comprises several television signal sources SA, SB, SC, SD, ST. The source ST is, for example an aerial or a group of aerials for receiving terrestrial broadcasts associated with one or several amplifiers situated in their vicinity for the purpose of improving the signal-to-noise ratio. The sources SA, SB, SC, SD use parabolas for receiving the satellite broadcasts associated with the corresponding receiver ends and converters (LNC) which are used, inter alia, to decrease the frequency of the signal so as to convey it in the band of 950 to 1750 MHz mentioned above. In the relevant embodiment there is one source ST for receiving terrestrial broadcasts, supplying its signals in a frequency range between 40 and 860 MHz through a cable T, and there are four sources for satellite broadcasts, supplying signals in a frequency range between 950 and 1750 MHz through cables A, B, C, D. All these sources are situated close together, for example, on the roof of a building.

The system is also provided with a multiple coupler 65 to which the signals of the sources connected at A, B, C, D, T are applied. At each of its four output connections 64, this coupler supplies the coupled signals from the connections A and T, the coupled signals from the connections B and T, the coupled signals from the connections C and T, the coupled signals from the connections D and T, respectively, which signals may also be amplified. The assembly of signal sources thus has four outputs 64. This assembly is followed by a distribution network comprising four cables, i.e. as many cables as there are satellite signal sources.

Proximate to the users, the cables of the distribution networks are connected to a shunting unit 69. A shunting unit is well known to those skilled in the art and it comprises means for permanently taking off a pan of the power of a signal on a connected line and for applying it to a predetermined impedance output for a particular use. The shunting unit 69 has a multiple form: it comprises four elementary shunters whose outputs are connected via connections 57, 58, each constituted by four coaxial connectors to the inputs of the two switching units 61, 62 each having four input connectors. Each output connector of one of these switching units is in its turn connected to one of said user installations by means of a cable 1 (or 2, 3, . . . 8) which will hereinafter be referred to as "user cable". The user installations form a group of eight installations in this case, divided into two sub-groups of four, and each of the two sub-groups is served by a switching unit 61, 62, respectively.

Each switching unit has means (not shown) which can easily be made by those skilled in the an on the basis of programmable (electronic or mechanical) switches for selecting one of its four inputs and for connecting it to one of its four outputs (1-4 or 5-8) as a function of the value of a control signal, and this for each of the four outputs. This control signal is applied to each of the user cables 1 to 8 and may easily be separated from the relevant television signals because of their very different frequencies. The control voltage is, for example, a DC voltage, possibly with a superimposed low-frequency voltage.

Figure 2:
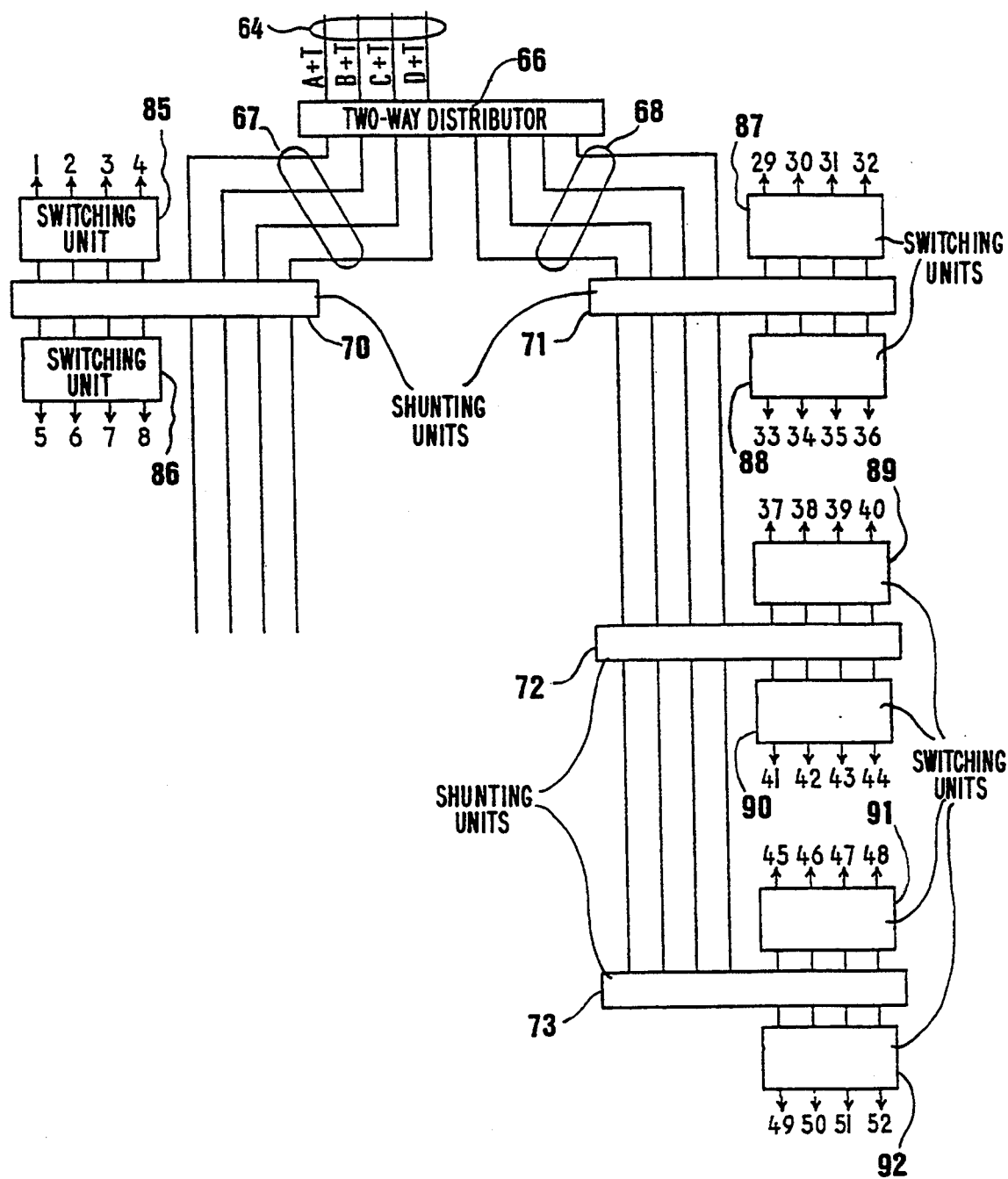
FIG. 2 is a diagram of a medium size system serving 52 users, in which system the user installations are not shown.

The television signal cable distribution system, whose diagram is shown in FIG. 2, serves 52 user installations. It comprises several television signal sources and a multiple coupler, similarly as in the system shown in FIG. 1, and for this reason these elements are not shown again.

The four inputs A+T, B+T, C+T, D+T of the multiple coupler are coupled to four inputs of a two-way distributor 66 situated proximate to the assembly of signal sources. This distributor is a member which distributes the signals from one cable to two cables. The four cables 64 of FIG. 1 are thus replaced by twice four cables: there are two distribution networks 67, 68.

A plurality of shunting units 70, 71 to 73, each of which is allocated to a group of user installations, is provided in each of these distribution networks. Each shunting unit 70 to 73 serves a group of eight installations in association with each time two switching units having four outputs, the switching units 85 and 86 serving, for example the installations 1 to 8 and the switching units 87 to 92 serving the installations 29 to 52. There are installations arranged symmetrically with respect to the installations 37 to 52, but these are not shown for the purpose of simplifying the Figure.

Figure 3:
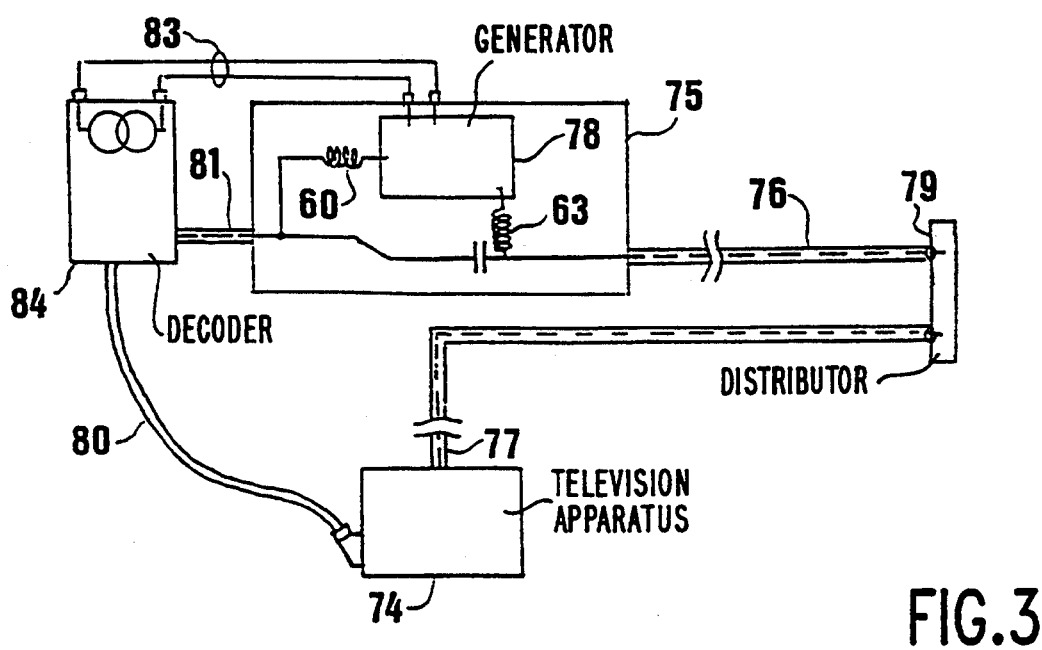
FIG. 3 shows diagrammatically a user installation.

The user installation shown in FIG. 3 comprises:
a television apparatus 74,
a satellite decoder 84 having an input for satellite television signals,
a control and connection unit 75,
and a distributor 79 connected by means of a user cable (not shown) to an output of one of the switching units to be described hereinafter with reference to FIG. 2 (reference numeral 61 or 62). This distributor comprises a known separating filter for separating in accordance with the frequency to be provided to the television apparatus 74 and to the decoder 84 (i.e. the bands 40-820 MHz and 950-1750 MHz, respectively). It also transmits low-frequency DC currents at least to the decoder 84. The signal decoded by the decoder 84 is applied in the baseband to the television apparatus 74 by means of a peripheral television connection 80.

The input of the decoder for satellite television signals is connected to the unit 75 by means of a connection cable 81. This connection may be made by means of a very short cable, as the unit 75 is arranged, for example, behind the decoder 84 or at least in its vicinity. It is even possible to use a connector on the unit 75 and directly plug it into the connector of the decoder 84 (the unit 75 is small and lightweight). The unit 75 itself is connected by means of a cable 76 to the distributor 79. In practice, the control and connection unit is inserted in the cable between the output of the switching unit (61, 62, FIG. 2) and the television signal input of the satellite decoder. The television apparatus is connected to the distributor 79 by means of a cable 77. The cables are connected by means of plugs which, for the purpose of simplifying the Figure, are not shown.

The unit 75 comprises connection means for AC communication (at least in the 950-1750 MHz band) via a series-arranged capacitance between the part of the cable 76 with the connector or the part of the cable 81 connected to the decoder. As a function of the choice made by the user, the majority of commercially available decoders may generate a DC voltage of 14 or 18 V at their input connector (here 81) for selecting one of two polarizations. Certain commercially available decoders (but not all) may also generate a DC voltage whose values usually range between 0 and 42 mA in a two-wire connection (here 83) for controlling a specific magnetic polarizer ("polarotor") implemented to function with this decoder.

The control and connection unit 75 comprises a control signal generator 78 which applies a control signal from the selection source to the cable 76 via a signal-blocking inductance 63, which control signal is different from that supplied by the decoder. This control signal generator is connected to the input 81 of the satellite decoder via a signal-blocking inductance 60 and also to said two-wire control current connection 83 and determines the value of the control signal voltage to be applied as a function of the value of the voltage supplied by the satellite decoder at its input 81 and as a function of the value of said current generated on the connection 83. As the current value and the user instructions can be programmed in the decoder, the generator 78 need not be programmable: it is the decoder which is programmed for furnishing the current desired for each choice made by the user.

In accordance with a first embodiment the control voltages generated by the generator 78 assume discrete values, for example 0 V, 3 V, 6 V, 9 V etc., each of which corresponds to a different selection to be made by means of the switching unit. The value of 0 V preferably corresponds to a selection on the part of the switch in order that the latter furnishes a suitable signal because it is associated with an installation which furnishes no control voltage (the installation does not comprise the connection unit according to the invention).

In another embodiment the control voltages generated by the generator 78 assumes discrete DC voltage values, for example, 14 V and 18V, and an AC voltage having, for example an efficient value of 1 V and a frequency of 22 kHz which is either or not superimposed thereon. Thus either 14 V DC or 14 V DC+1 V AC at 22 kHz, or 18 V DC, or 18 V DC+1 V AC at 22 kHz is available, which thus provides four possibilities, each of which corresponds to a different selection to be made by means of the switching unit. This second embodiment can easily be realised because it is sufficient to transmit the voltage to the output of the decoder 84 without any modification in the case where the signal supplied corresponds to 14 V or 18 V DC.

Each apartment may be connected to several outputs of the switching unit, for example, to two outputs in order to be able to simultaneously receive a signal from two different satellites, for example, for recording one signal on a video recorder and for displaying the other signal.

Figure 4:
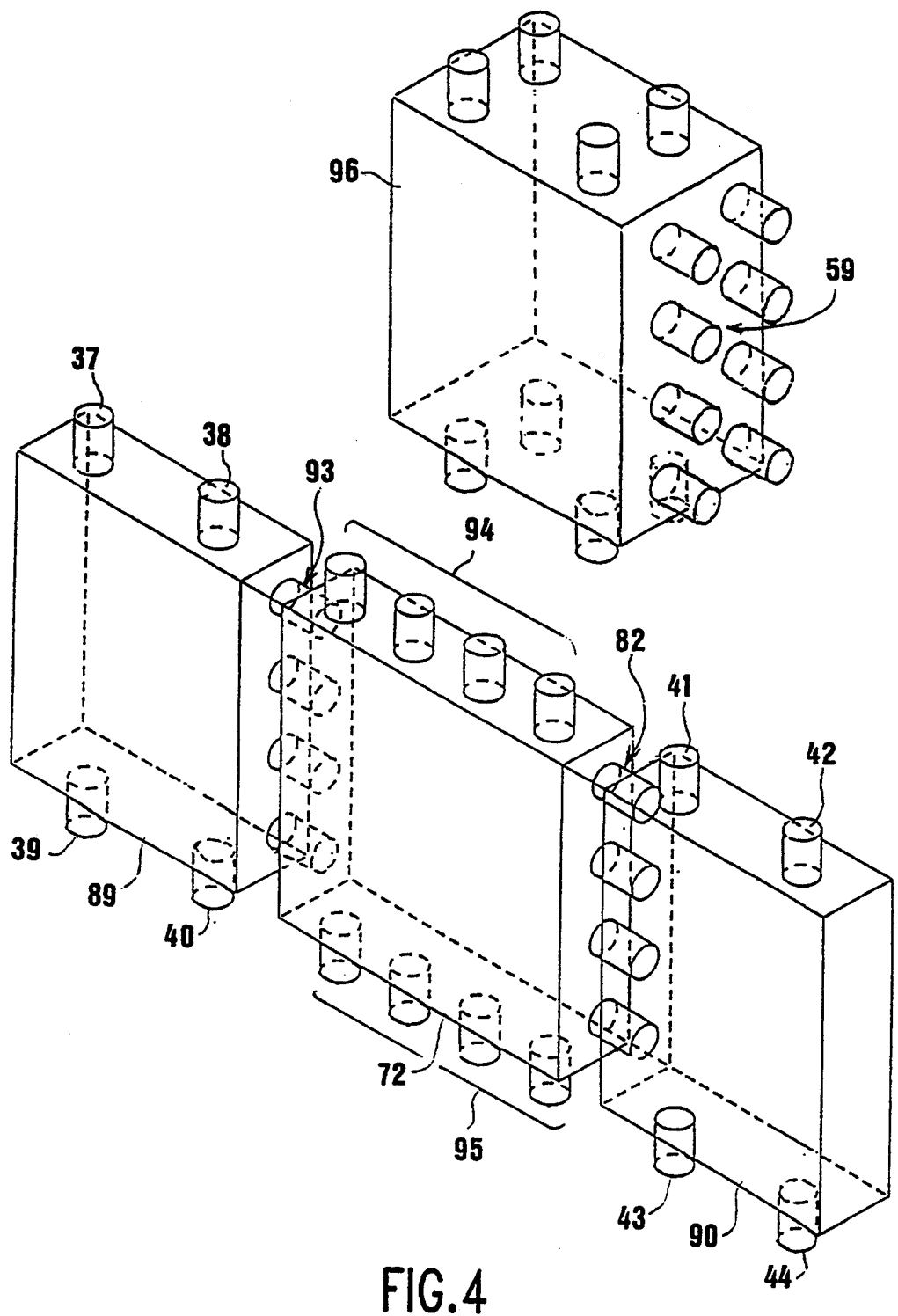
FIG. 4 is a perspective view of an assembly comprising one shunting unit and two switching units.

In the assembly of one shunting unit and two switching units shown in FIG. 4, the shunting unit 72 having a parallelepiped shape is provided for a number of four cables. For their connection to these cables, the latter are divided into sections and each section is connected to the shunting unit. To this end the shunting unit has four cable input connectors 94 and four cable output connectors 95 (however, a terminal unit, like unit 73 in FIG. 2, does not have connectors 95). All the shunting units also comprise four output connectors 82 and four output connectors 93 situated on two opposite, elongate sides. In contrast, there is no connector on the two opposite sides, which are virtually square, proximate to the side comprising the output connectors 82, or the side comprising the output connectors 93.

The switching units 89 and 90 having a parallelepiped shape each comprise four input connectors 93 or 82 on a side corresponding to the output connectors of the shunting unit 72. The connectors 37 to 44 are connected to the user installations via the user cables.

A second type of switching unit denoted by reference numeral 96 comprises twice four input connectors on the same side 59. They are also arranged in correspondence to the output connectors of the two shunting units arranged side by side and coupled by a side without connectors. If, for example, there are eight separate satellite signal sources, two units like unit 72, coupled by one of the square sides without connectors are arranged proximate to each group of user installations and the eight cables are connected thereto by means of twice four connectors 94 (and twice four connectors 95, except in the case of a terminal unit) and a switching unit of the type similar to the unit 96 is plugged into the eight connectors 82 (or 93) on the two units 72 arranged side by side.

The principal advantage of the inventive concept is that it is possible to cover a widely divergent range of installations with a limited set of switching units and shunting units. The set may comprise, for example:

as regards the switching units: models having four inputs/four outputs (reference numeral 89 or 90, FIG. 4) for serving four users when four satellite sources are available, models having four inputs-/eight outputs (not shown) for serving eight users when four satellite sources are available, models having eight inputs/four outputs (not shown) for serving four users when eight satellite sources are available, and models having eight inputs/eight outputs (reference numeral 96, FIG. 4) for serving eight users when eight satellite sources are available.

If, for example the number of users of a group is increased, the installation may be easily enhanced by replacing a unit having four outputs by a model having eight outputs, and when, for example the number of sources increases in the course of time, the installation may be enhanced by replacing the units having four inputs by models having eight inputs;

as regards the shunting units: models at the head of a distribution network "20 dB" (shunting units 70 and 71, FIG. 2), intermediate models "15 dB" (shunting unit 72, FIG. 2) and terminal models "11 dB" (shunting unit 73, FIG. 2), the choice of the model to be used depending on its distance from the sources via the distribution network.

The same limited set-up may also be used in individual houses. In this case there is also an assembly of sources, like the sources SA, SB, ST in FIG. 1, with a multiple coupler which is analogous to the coupler 65 in FIG. 1, possibly without amplification and without a shunting unit, but with a switching unit having four inputs/four outputs so that the individual user can have the disposal of up to four connectors for four separate television installations.

I claim:

1. A system for distributing television signals to a plurality of user installations, said system comprising:
   a. a plurality of sources of respective satellite television signals;
   b. a source of a terrestrial television signal;
   c. a multiple coupler having inputs coupled to the satellite television signal sources and to the terrestrial television signal source and having outputs for each producing a respective one of the satellite television signals in combination with the terrestrial television signal;
   d. a distribution network comprising a number of distribution cables, each being coupled to a respective one of the outputs of the multiple coupler;
   e. branching means for coupling the distribution network to the user installations, said branching means including:
      i. a shunting unit having inputs coupled to respective ones of the distribution cables, having a group of outputs, and including means for transferring a portion of the signal power on each of said distribution cables to a corresponding one of the outputs in said group; and
      ii. at least one switching unit having a plurality of inputs, each being coupled to one of the outputs in said group, and having at least one output coupled to a respective one of said user installations, said switching unit including means for selectively connecting said at least one output to one of said plurality of inputs in response to a control signal from said respective one of said user installations.

2. A system as in claim 1 where the shunting unit has first and second groups of outputs.

3. A system as in claim 1 where the shunting unit has four inputs, each coupled to a respective one of the distribution cables.

4. A system as in claim 1 where said at least one switching unit has four outputs.

5. A system as in claim 1 where said at least one switching unit has eight outputs.

6. A system as in claim 1, 2, 3, 4 or 5 where the shunting unit has a parallelepiped shape defined by four peripheral sides and first and second opposing sides and is adapted for coupling to a number N of the distribution cables, at least one of said peripheral sides having N output connectors and neither of said first and second opposing sides having any connectors.

7. A system as in claim 6 where said at least one switching unit has a parallelepiped shape defined by four peripheral sides and first and second opposing sides, one of said peripheral sides having N input connectors corresponding to the N output connectors of the shunting unit.

8. A system as in claim 6 comprising first and second ones of said shunting unit, each having said N output connectors, and where said at least one switching unit has a parallelepiped shape defined by four peripheral sides and first and second opposing sides, one of said peripheral sides having 2N input connectors corresponding to the output connectors of said first and second ones of said shunting unit.

9. A system as in claim 1 where at least one of said user installations includes a connection and control unit and a satellite decoder, coupled to the at least one switching unit via said connection and control unit, for providing said control signal.

* * * * *